PROCESS OF DISSOLVING FUEL ELEMENTS OF NUCLEAR REACTORS

Eugene M. Vander Wall, Idaho Falls, David L. Bauer, Pocatello, and Harold T. Hahn, Idaho Falls, Idaho, assignors to the United States of America as represented by the United States Atomic Energy Commission
No Drawing. Filed Nov. 2, 1961, Ser. No. 149,785
4 Claims. (Cl. 204—154.2)

This invention deals with the dissolution of jacketed or canned fuel elements of nuclear reactors and in particular with the dissolution of fuel elements that consist of a core containing uranium dioxide and a cladding of stainless steel or a zirconium-base metal.

Heretofore, in dissolving fuel elements of the type just described, two separate steps had to be applied, one for the removal of the cladding, which can be done either by mechanical means or by dissolution in a suitable acid, and the second step for the dissolution of the uranium-dioxide-containing core.

It is an object of this invention to provide a process for the dissolution of uranium-dioxide-containing fuel elements of nuclear reactors clad with stainless steel or zirconium-base metal by which both the cladding and the core material can be dissolved in one single step.

It is another object of this invention to provide a process for the dissolution of uranium-dioxide-containing fuel elements of nuclear reactors clad with stainless steel or zirconium-base metal in which dissolution is accomplished in a relatively short time.

It is finally also an object of this invention to provide a process for the dissolution of uranium-dioxide-containing fuel elements of nuclear reactors clad with a zirconium-base metal, in which dissolution and separation of zirconium from uranium are accomplished simultaneously in one single step.

Stainless steel as well as zirconium dissolve readily in molten lead chloride through which chlorine gas is bubbled; however, in this solvent medium dissolution of uranium dioxide is extremely slow, which makes the lead chloride-chlorine combination impractical. It was found that by the addition of a copper substance, such as metallic copper, cuprous or cupric chloride, the dissolution rate of uranium dioxide in the lead chloride-chlorine is drastically increased. The inventors do not know what the part is that the copper plays in this reaction, but it is believed that cupric chloride forms and performs the role of a catalyst. The process of this invention is based on these findings.

The process of this invention comprises immersing the clad fuel element in molten lead chloride at a temperature between about 500 and 550° C., adding a copper substance, namely metallic copper, cuprous chloride or cupric chloride, to the molten mass, and bubbling chlorine gas through the mass whereby the entire fuel element, cladding and core, are readily dissolved.

In developing the process of this invention, the lead chloride-chlorine combination alone without copper, as has been mentioned before, and also lead chloride plus one of the copper substances enumerated above without chlorine were investigated; it was found, however, that neither of these binary combinations accomplished the result of this invention, namely dissolution of the uranium dioxide at a practicable rate. The presence of all three compounds is thus necessary to achieve the objects of this invention. This will be shown later in Example I.

The quantity of lead chloride necessary for the process of this invention is not critical as long as it is sufficient for dissolution of the uranium dioxide, the cladding material and of the uranium chloride formed. Usually an amount of lead chloride about three times that of the weight of uranium dioxide was satisfactory.

The chlorine should be introduced in an amount excessive of that stoichiometrically required for the chlorination of uranium dioxide fuel, cladding material and also of copper if this was added in metallic form. In calculating the chlorine quantity, to be on the safe side, it is well to assume that the final product formed of the uranium dioxide is uranium tetrachloride. Actually, however, it is more likely that the chloride in which the uranium dioxide is dissolved is the uranyl chloride. The flow rate of the chlorine current is not critical; however, a flow within the range of from 10 to 130 mg./min. was preferred.

The concentration of the copper material, as of most true catalysts, can be very low, and concentrations as small as 0.003 M, in regard to the lead chloride, have proved adequate.

In the following, an example is given in which various dissolving procedures using lead chloride are compared.

Example 1

The dissolution rate of uranium dioxide was determined (a) in lead chloride alone at 800° C., (b) in lead chloride at 550° C. through which a current of chlorine was continuously passed, (c) in lead chloride in which copper was dissolved, prior to the introduction of the uranium dioxide, by passing a chlorine current through the molten lead chloride, (d) in a cuprous-chloride-containing lead chloride, also while chlorine was passed through the melted salt, (e) in a lead chloride-cuprous chloride mixture without chlorine, and (f) in a lead chloride-cupric chloride mixture without chlorine. The results of these six groups of experiments are compiled in the table below. The concentrations of the catalyst in this table, where expressed as the molality (M), are in regard to the lead chloride.

| System | Temp., °C. | Catalyst, M | $Cl_2$ rate, mg./min. | $UO_2$ dissolution rate, mg./cm.$^2$/min. |
|---|---|---|---|---|
| $PbCl_2$ | 800 | | | $3 \times 10^{-4}$ |
| $PbCl_2$—$Cl_2$ | 550 | | 19 | 0.066 |
| | 550 | | 31 | 0.099 |
| | 550 | | 79 | 0.262 |
| $PbCl_2$—$Cl_2$—Cu | 550 | .042 | 11 | 2 |
| | 550 | .781 | 45 | 45 |
| | 550 | .399 | 63 | 61 |
| $PbCl_2$—$Cl_2$—$CuCl$ | 550 | .0041 | 122 | 0.3 |
| | 550 | .67 | 62 | 55 |
| | 550 | .183 | 130 | 18 |
| 90.4 mole percent $PbCl_2$, 9.6 mole percent $CuCl$ | 550 | | | $2.3 \times 10^{-3}$ |
| 83.9 mole percent $PbCl_2$, 16.1 mole percent $CuCl_2$ | 550 | | | 2.3 |

It will be obvious that in those runs in which copper chloride and chlorine were present, the dissolution rate was radically improved. (The dissolution of the metallic copper probably resulted in a mixture of cuprous and cupric chlorides.)

The dissolution rates of the most customary cladding materials per se were also determined. For instance, it was ascertained that zirconium metal dissolved at a rate of above 300 mg./cm.$^2$/min. in lead chloride at 550° C. Stainless steel-347, which is an iron alloy containing from 17–19% chromium, from 9–12% nickel, up to 0.08% carbon, up to 2% manganese, up to 1% silicon, up to 0.04% phosphorus, up to 0.03% sulfur, and niobium at least 10 times the carbon content, dissolved in lead chloride through which chlorine was passed at a flow of 0.8 g./min. at a rate of 30 mg./cm.$^2$/min.

In the following, an example is given for the dissolution of a zirconium-clad fuel material by the process of this invention.

*Example II*

A piece of a 1.05-cm. wide fuel rod containing 10.4 grams of uranium dioxide clad with 6.2 grams of zirconium was dissolved by immersion in a molten mixture of 1.4 grams of copper in 35 grams of lead chloride through which chlorine gas was passed at a rate of 110 mg./min. The temperature of the salt mixture was held at 550° C. The fraction of the fuel rod was immersed stepwise, with not more than ¼ inch being submerged at a time. The chlorine introduction was continued until the melt solidified, which was an indication that the salt was saturated in uranyl chloride. The final composition of the melt at that point was 20.6 mole percent of uranyl chloride, 11.8 mole percent of copper chloride and 67.6 mole percent of lead chloride. At the temperature of 550° C. the zirconium was volatilized as the tetrachloride and thus separated from the uranium. The dissolution was complete in four hours, and 44% of the chlorine introduced had been consumed by the reaction. A more rapid immersion or even a complete immersion at the beginning, of course, would accelerate the dissolving procedure still more.

Chlorides other than the copper chlorides were also found suitable as catalysts for the process of this invention. For instance, thallium chloride and iron chloride improved the dissolution rate. In one instance, 0.94 gram of thallous chloride was added to 20 grams of lead chloride at 550° C. A uranium dioxide pellet (3.81 cm.$^2$) was introduced, and chlorine gas was passed through the melt at a rate of 34 mg./cm.$^2$/min. The uranium dioxide dissolved at a rate of 0.99 mg./cm.$^2$/min.

In another instance, 1.38 grams of pure iron were dissolved in a lead chloride-chlorine system at 550° C., and a uranium dioxide pellet of the same size as in the preceding experiment was introduced, while chlorine was passed through the melt for 15 minutes at a rate of 733 mg./min. The average dissolution rate was 822 mg./cm.$^2$/min.

It will be understood that the invention is not to be limited to the details given herein but that it may be modified within the scope of the appended claims.

What is claimed is:

1. A process of dissolving an element having a core of uranium-dioxide-containing material and a jacket around said core of a material selected from the group consisting of stainless steel and a zirconium-base metal, comprising immersing said element in molten lead chloride, adding a copper catalyst selected from the group consisting of copper, cuprous chloride and cupric chloride to the molten lead chloride, and passing chlorine gas through the molten lead chloride whereby both jacket and core of the element are dissolved.

2. The process of claim 1 wherein the molten salt is maintained at a temperature of between 500 and 550° C.

3. The process of claim 2 wherein the catalyst is cupric chloride.

4. A process of dissolving a zirconium-clad element of uranium dioxide, comprising immersing said element in molten lead chloride containing a small amount of cupric chloride, heating the chloride mixture to about 550° C., passing a current of chlorine through the chloride mixture whereby the element is dissolved and the zirconium is volatilized as the chloride.

References Cited in the file of this patent

UNITED STATES PATENTS 3,023,078     Allen et al. _____ Feb. 27, 1962

OTHER REFERENCES

Reactor Fuel Processing, October 1960, vol. 3, No. 4, pp. 32 and 33.